United States Patent [19]

Fahim et al.

[11] 4,102,315

[45] Jul. 25, 1978

[54] PROPORTIONAL CONTROLLER FOR CONTROLLING AIR FLOW TO AN ENGINE

[75] Inventors: Magdi M. Fahim, Rochester, Mich.; William D. Marscher, Coventry, Conn.

[73] Assignee: The Bendix Corporation, Southfield, Mich.

[21] Appl. No.: 759,309

[22] Filed: Jan. 14, 1977

[51] Int. Cl.[2] .................... F02M 23/04; F02M 23/10
[52] U.S. Cl. .......................... 123/124 B; 123/124 A; 123/124 R; 123/119 D; 123/179 A; 123/119 F; 123/119 EC; 261/39 A; 261/39 D
[58] Field of Search ........... 123/124 B, 124 A, 124 R, 123/119 F, 119 D, 97 B, 119 EC, 179 A; 261/39 A, 39 D, 41 D, 63

[56] References Cited

U.S. PATENT DOCUMENTS

| | | | |
|---|---|---|---|
| 3,645,509 | 2/1972 | Eckert | 261/39 A |
| 3,670,709 | 6/1972 | Eckert | 123/124 R |
| 3,866,588 | 2/1975 | Nakada et al. | 123/124 R |
| 3,960,130 | 6/1976 | Peterson, Jr. | 123/179 A |
| 3,964,457 | 6/1976 | Coscia | 123/124 R X |

*Primary Examiner*—Wendell E. Burns
*Attorney, Agent, or Firm*—William A. Marvin

[57] ABSTRACT

A proportional controller controls the speed of an engine during start-up and warm-up periods by utilizing the properties of thermoexpansive and electroexpansive materials to regulate air flow to the engine in proportion to engine manifold vacuum, prevailing ambient temperature and a predetermined warm-up schedule.

10 Claims, 6 Drawing Figures

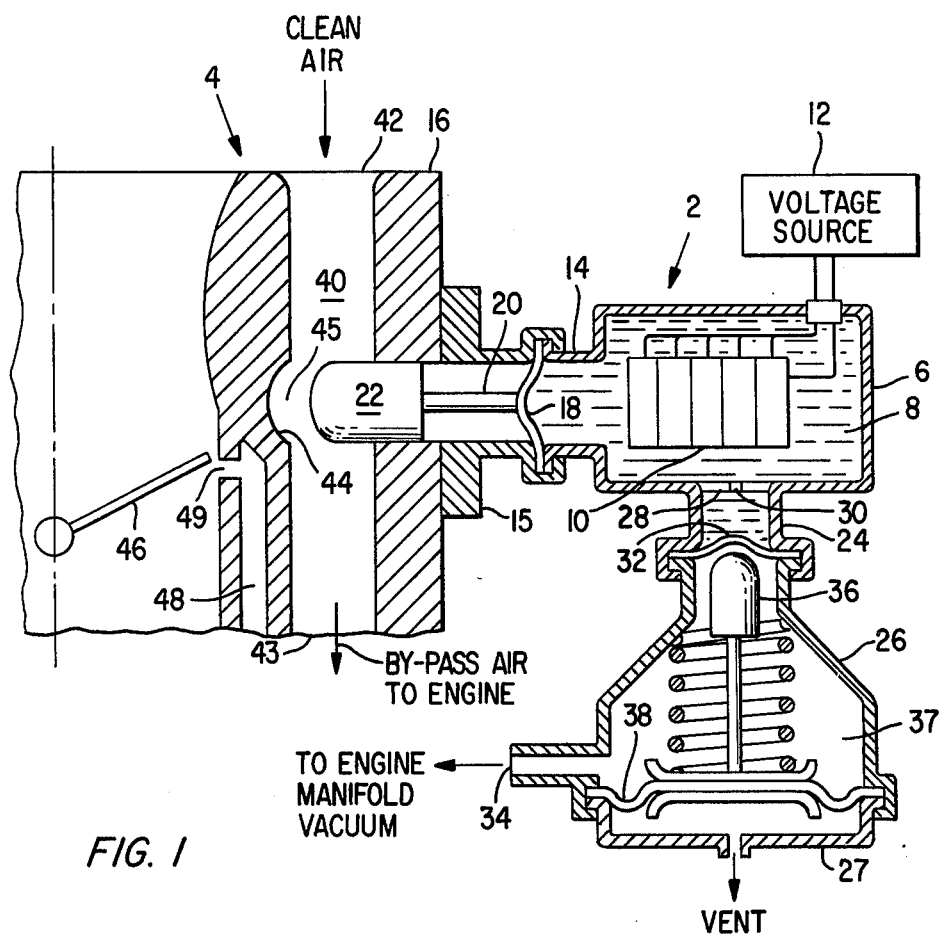
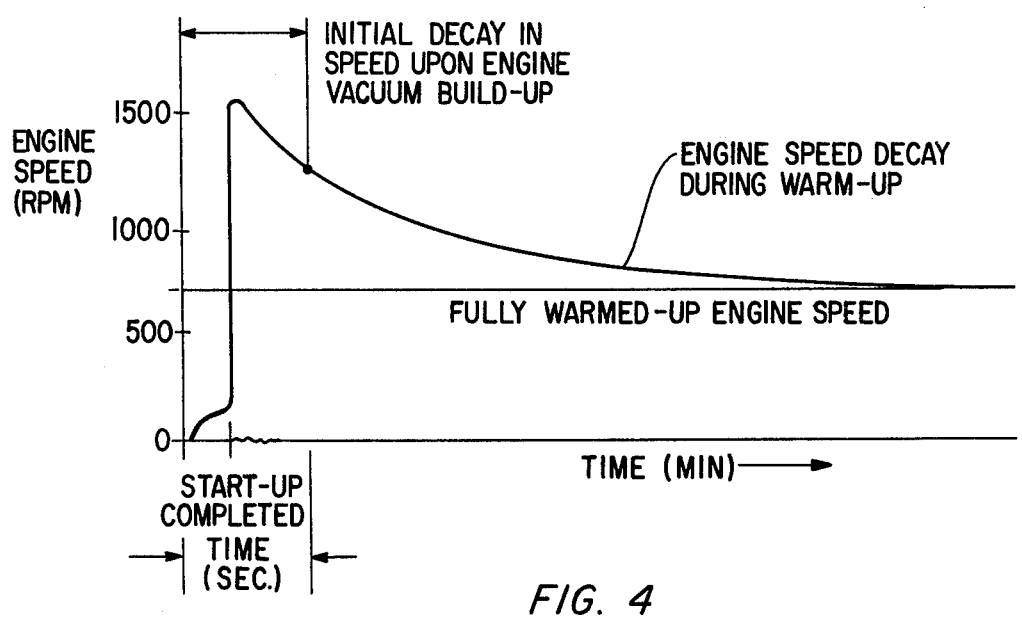

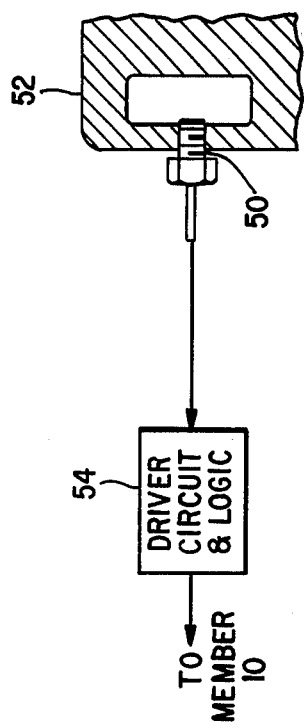
FIG. 5
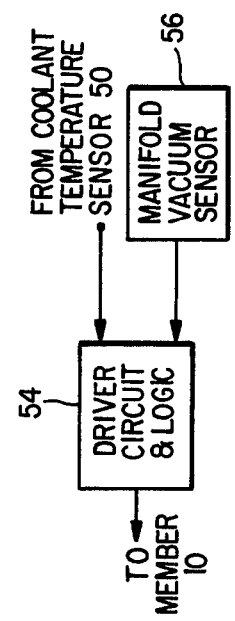
FIG. 6
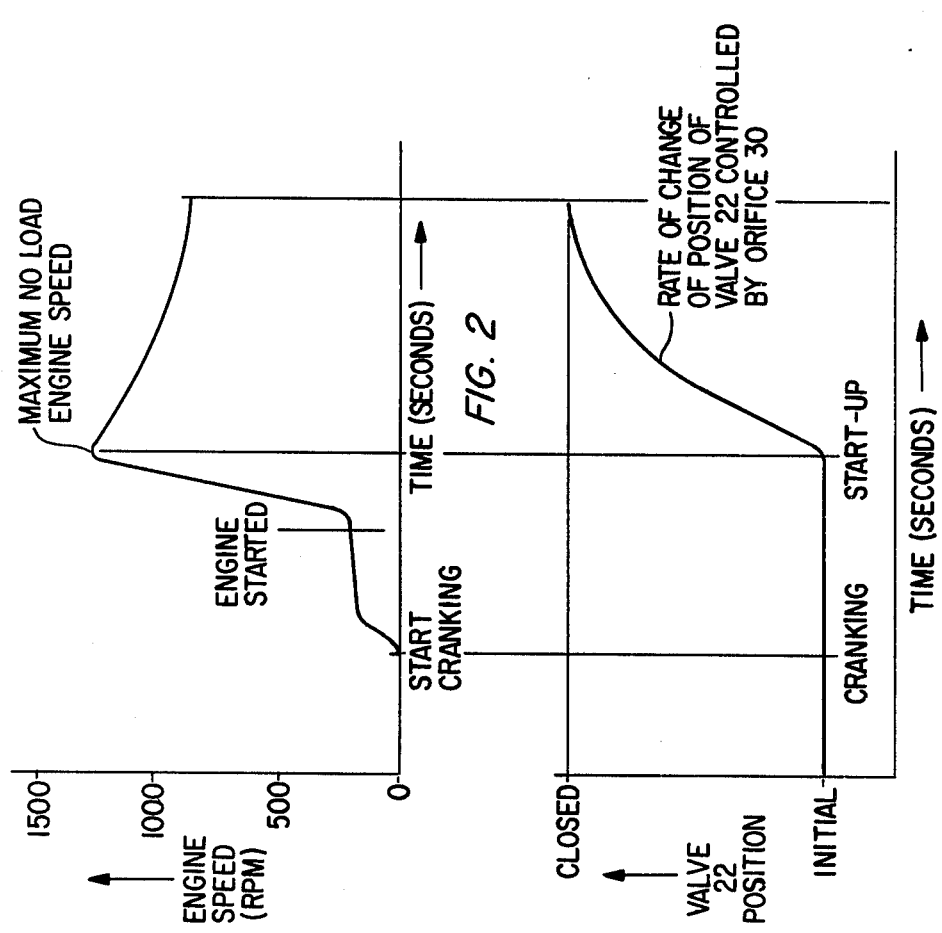
FIG. 2
FIG. 3

PROPORTIONAL CONTROLLER FOR CONTROLLING AIR FLOW TO AN ENGINE

BACKGROUND OF THE INVENTION

1. Field of the Invention

This invention relates to proportional controllers and particularly to proportional controllers utilizing the properties of thermoexpansive and electroexpansive materials. More particularly, this invention relates to proportional controllers of the type described which are particularly adaptable to regulating air flow to an engine.

2. Description of the Prior Art

Automotive engine cold-start and warm-up (fast idle) characteristics are known to depend upon adequate air flow and a proper air/fuel mixture to the engine. The air/fuel mixture to the engine may be controlled by a conventional carburetor, or by the more advanced electronic fuel injection systems that are well known in the art. Adequate air flow for these special conditions has in prior art systems been provided by a secondary bypass augmenting the primary throttled air supply. Generally, for a "cold start" condition substantially more air is necessary than for a warm up or "fast idle" condition. Thereafter, the "fast idle" amount of air should be reduced even further to a normal or "curb idle" when the engine has reached operating temperatures. It has been found that start-up and fast idle air flow may be advantageously controlled by a proportional controller type device. The particular proportional controller disclosed herein utilizes the characteristics of a substantially incompressible thermoexpansive fluid such as silicone, wax or fluorocarbon compounds and the characteristics of an electroexpansive material such as a piezoelectric stack to actuate the controller. The characteristics of the materials effect a proportional displacement of the controller whereby air flow to the engine is controlled. Prior art controllers for the purposes described have not used the combined characteristics of thermoexpansive and electroexpansive materials to control air flow to an engine during start-up and warm-up periods as does the present invention to be hereinafter described.

SUMMARY OF THE INVENTION

This invention provides a proportional controller which is effective during engine start-up to increase engine speed and subsequently controls said speed during warm-up (fast idle) of the engine. The controller is responsive to engine manifold vacuum, ambient temperature and a predetermined warm-up schedule, and utilizes the characteristics of electroexpansive and thermoexpansive materials. Initially the position of the controller is proportional to prevailing ambient temperature conditions. Prior to start-up the engine manifold vacuum is substantially zero and has no effect on the controller, with the controller thereupon being in an equilibrium (force balance) position. Air flow to the engine is therefore at a maximum. During engine cranking the manifold vacuum is low and the controller will remain in the equilibrium position. Upon engine start-up, the manifold vacuum builds up, whereby the interaction between engine manifold vacuum and the imcompressible thermoexpansive material causes a volumetric displacement of said material to provide a proportional displacement or closing of the controller whereby air flow is diminished. After start-up, the position of the controller is proportional to the rate of volumetric displacement of the thermoexpansive material which is attributed to the effect of an electroexpansive member, or a heater or the like, in cooperative relation with the thermoexpansive material.

One object of this invention is to provide a proportional controller for controlling air flow to an engine during engine start-up and warm-up periods.

Another object of this invention is to provide a proportional controller of the type described which is operated in proportion to engine manifold vacuum and ambient temperature, and a predetermined warm-up schedule.

Another object of this invention is to provide a proportional controller of the type described which is operated as a function of the characteristics of thermoexpansive and electroexpansive materials.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE DRAWINGS

FIG. 1 is a diagrammatic representation of a proportional controller in accordance with the invention and in conjunction with an engine with which the controller may be used, and particularly showing an embodiment of the invention utilizing an externally energized electroexpansive member.

FIG. 2 is a graphical representation showing engine speed as a function of time as effected by the proportional controller shown in FIG. 1.

FIG. 3 is a graphical representation showing the rate of change of position of the controller of the invention as a function of time.

FIG. 4 is a graphical representation showing engine speed as a function of the time from cranking to a fully warmed-up engine as affected in accordance with the several embodiments of the invention.

FIG. 5 is a combination block diagram-diagrammatic representation showing an embodiment of the invention wherein the electroexpansive member is responsive to sensed engine coolant temperature.

FIG. 6 is a block diagram showing an embodiment of the invention wherein the electroexpansive member is responsive to sensed manifold vacuum and engine coolant temperature.

DESCRIPTION OF THE INVENTION

As will be hereinafter more fully described, in the preferred embodiment of the invention the proportional controller operates in response to the characteristics of an electroexpansive member which may be, for purposes of illustration, of a piezoelectric material, and the characteristics of a thermoexpansive material such as silicone, wax or any of the fluorocarbon compounds which are well known in the art.

The volumetric expansion of the electroexpansive member is proportional to an applied voltage and can be linear or non-linear depending upon the mechanical and chemical structure of the material of which the member is made. The volumetric expansion can be modified by mechanical, electrical or electromechanical means. Mechanical modification can be provided by changing the configuration or shape of electroexpansive elements which may be arranged in stacks or the like. The electrical modification is controlled by the applied voltage. Non-linear volumetric expansion most easily obtained by means of a non-linear energizing voltage from a suitable voltage source. In view of the foregoing, it will be obvious to those skilled in the art that further control of volumetric expansion of the electroexpansive material can be achieved by combined electrical and mechanical means as well. In any event, the volumetric expansion is utilized to provide a volumetric displacement for actuating the controller of the invention.

The thermoexpansive material is essentially an incompressible fluid and in the structural arrangement of the invention the volumetric expansion of the material is initially sensitive to ambient temperature, then to engine manifold vacuum and finally to the volumetric displacement of the electroexpansive material. Additives to the thermoexpansive material, such as copper or aluminum flakes, have a modulating affect on the volumetric expansion of the material as may be necessary for a particular application and as will be understood by those skilled in the art.

With the above in mind, several embodiments of the invention will be described with reference to the drawings.

With reference first to FIG. 1, an embodiment of the invention featuring a proportional controller designated generally by the numeral 2 is shown in conjunction with that portion of an engine as is necessary to describe the operation of the controller. The engine portion is designated generally by the numeral 4.

Controller 2 includes a housing 6 containing therein a suitable thermoexpansive material 8 having characteristics as heretofore noted. Disposed within the thermoexpansive material is a suitable electroexpansive member 10 having characteristics as heretofore noted, and which electroexpansive member is shown connected to a suitable energizing voltage source 12.

Housing 6 has an axially disposed neck portion 14 which is suitably coupled to a connecting section 15 of an engine throttle 16. A diaphragm 18 is captured between neck portion 14 and connecting member 15. A valve member 22 is arranged for displacement within throttle 16 for purposes which will be hereinafter described. Diaphragm 18, which acts to contain thermoexpansive material 8 within housing 6, is disposed adjacent valve stem 20 so as to displace valve 22 upon flexing of the diaphragm due to the volumetric expansion of thermoexpansive material 8.

Housing 6 includes a normally extending neck portion 24 which is suitably coupled to a housing 26. A resistrictor 28 including a damping orifice 30 is disposed intermediate housing 6 and neck portion 24 thereof. A diaphragm 32 is captured between housing 26 and neck portion 24 of housing 6 and, as diaphragm 18, acts to contain thermoexpansive material 8 within housing 6.

Housing 26 includes a port 34 connected to the engine manifold vacuum. A spring loaded actuator 36 is coupled to a diaphragm 38 which is captured between housing 26 and a vented bottom cover plate 27 thereof. Actuator 36 is axially disposed in a plenum 37 in housing 26 near diaphragm 32 so as to flex the diaphragm in proportion to engine manifold vacuum.

Valve 22 is disposed within an air channel 40 in throttle 16, and which air channel receives clean air at its inlet portion 42 and by-passes air to the engine at its outlet portion 43 as is well known in the art. Valve 22, in conjunction with a cavity 44 in channel 40, provides a fast idle air control orifice 45. Engine 4 further includes throttle valves 46, an engine vacuum channel 48 and a suitable vacuum port 49 as is well known in the art.

OPERATION OF THE INVENTION

Start-up and warm-up (fast idle) air flow to the engine is controlled by the position of valve 22 which defines the area of control orifice 45. The position of diaphragm 18 is initially proportional to the prevailing ambient temperature of the engine. Since the engine manifold vacuum prior to the start-up sequence is zero, diaphragm 38 will be in an equilibrium or force balance position and orifice 45 will be at its maximum area to provide maximum air flow through channel 40.

During engine cranking, the engine manifold vacuum is minimal, and hence diaphragm 38 will remain in the equilibrium position. Upon engine start-up, the engine manifold vacuum increases causing diaphragm 38 to flex which, in turn, displaces actuator 36. The displacement of actuator 36 flexes diaphragm 32 to cause volumetric displacement of thermoexpansive material 8. This, in turn, results in the flexing of diaphragm 18 which causes displacement of valve 22 to reduce the area of orifice 45 for ultimately closing the orifice and blocking the flow of air through channel 40.

In the invention as herein described, engine speed as a function of time and the position of valve 22 as a function of time are illustrated in the graphical representations of FIGS. 2 and 3, respectively. In this connection it is to be noted that the rate at which the position of valve 22 changes can be controlled by damping orifice 30 shown in FIG. 1, the size of which affects the rate of volumetric displacement of thermoexpansive material 8.

After completion of the engine start-up period, at which time the engine manifold vacuum is substantially constant, the position of valve 22 is proportional to the volumetric displacement of thermoexpansive material 8 which is attributed to the volumetric expansion of electroexpansive member 10 as illustrated in the graphical representation of FIG. 4. In other words, the volumetric expansion of member 10 causes a proportional volumetric displacement of thermoexpansive material 8 to provide the desired valve positioning and ultimate closing of orifice 45.

In this connection it is noted that although the embodiment of the invention shown in FIG. 1 features an electroexpansive member 10, member 10 may be any type of solid state electric heater (positive temperature coefficient ceramic solid state resistors) or any wire wound heater as may be desired to cause volumetric expansion of thermoexpansive material 8 a volumetric displacement or expansion of the fluid will have the same effect that is causing the proportional movement of valve 22.

As shown in the embodiment of the invention of FIG. 5, member 10, be it at electroexpansive stack or a heater as noted, rather than being energized by an external source as shown in FIG. 1, may be responsive to engine coolant temperature whereby a temperature sensor 50 arranged with an engine water jacket 52 provides a coolant temperature signal which is applied to a driver circuit 54 having appropriate logic for generating a signal which energizes member 10 as aforenoted.

Further, port 34 of housing 26 (FIG. 1) has been heretofore described as connected to the engine manifold vacuum, but a manifold vacuum sensor 56 whose output signal can be utilized in conjunction with the signal from coolant temperature sensor 50 as shown in FIG. 6 illustrates another embodiment of the invention. In this embodiment the signals from sensors 50 and 56 are applied to circuit 54 which provides a signal for application to member 10 for purposes as aforenoted.

The invention as described satisfies the objects which have been previously set forth. The combined characteristics of thermoexpansive and electroexpansive materials are utilized to adjust the position of valve 22 for regulating the flow of air to the engine during engine start-up and warm-up periods in proportion to engine manifold vacuum and ambient temperature, and a predetermined warm-up schedule.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A proportional controller for controlling air flow to an engine during engine start-up and warm-up periods, comprising:
   valve means including a valve member positioned in an engine air flow channel in cooperative relation therewith to provide an air flow control orifice, the valve position initially dependent upon the volume of a thermoexpansive and incompressible material sensitive to ambient temperature conditions, with the orifice area and air flow thereupon being at a maximum;
   first means responsive to engine manifold vacuum during the engine start-up period for displacing the valve in the channel to reduce the orifice area and the flow of air after the engine starts, said first means displacing said valve by acting on said thermoexpansive material; and
   second means in cooperative relation with the valve means for displacing the valve member in the channel during engine warm-up to ultimately close the orifice and block the flow of air through the channel when the engine is fully warmed up, said second means displacing said valve by acting on said thermoexpansive material.

2. A controller as described by claim 1,
   wherein the first means includes, a first housing and means responsive to engine manifold vacuum disposed therein;
   and wherein the valve means includes, a second housing containing said substantially incompressible fluid; and
   means associated with the second housing in operative relation with the valve member and with the means responsive to engine manifold vacuum disposed within the first housing;
   the means responsive to engine manifold vacuum being effective for displacing the means associated with the second housing upon an increase in manifold vacuum to cause a volumetric displacement of the incompressible fluid contained in the second housing, said volumetric displacement displacing the valve member to reduce the orifice area and the flow of air.

3. A controller as described in claim 2, wherein the means associated with the second housing in operative relation with the valve member and the means responsive to engine manifold vacuum disposed within the first housing includes:
   a first diaphragm disposed adjacent the valve member;
   a second diaphragm disposed near the means responsive to engine manifold vacuum disposed within the first housing;
   said first and second diaphragms containing the incompressible fluid within the second housing;
   the engine manifold vacuum responsive means flexing the second diaphragm upon the increase in manifold vacuum to cause the volumetric displacement of the incompressible fluid; and
   the first diaphragm being flexed by the volumetric displacement to displace the valve member.

4. A controller as described by claim 2, wherein:
   the substantially incompressible fluid contained within the second housing is a thermoexpansive fluid;
   the second means in cooperative relation with the first means includes a heater element which is electrically energized for heating the thermoexpansive fluid causing a proportional volumetric expansion thereof to displace the valve member in the channel during engine warm-up to ultimately close the orifice and block the flow of air through the channel when the engine is fully warmed up.

5. A controller as described by claim 2, wherein:
   the second means is cooperative relation with the valve means includes an electroexpansive member;
   said member volumetrically expanding upon being electrically energized and causing a proportional volumetric displacement of the incompressible fluid to displace the valve member in the channel during engine warm-up to ultimately close the orifice and block the flow of air through the channel when the engine is fully warmed up.

6. A controller as described by claim 1, including:
   an external voltage source for electrically energizing the second means.

7. A controller as described by claim 1, including:
   means for sensing the coolant temperature of the engine and for providing a corresponding signal; and
   circuit means responsive to the coolant temperature signal for providing a signal for electrically energizing the second means.

8. A controller as described by claim 7, wherein:
   the first means responsive to engine manifold vacuum during the engine start-up period for displacing the valve in the channel to reduce the orifice area and the flow of air includes a sensor for sensing the engine manifold vacuum and for providing a corresponding signal; and
   the circuit means being responsive to the coolant temperature signal and the engine manifold vacuum signal for electrically energizing the second means.

9. A controller as described by claim 3, including:
   damping means disposed beyond the second diaphragm for damping the volumetric displacement of the incompressible fluid when the second diaphragm is flexed upon an increase in manifold vacuum.

10. A controller as described by claim 3 wherein the means responsive to engine manifold vacuum disposed within the first housing includes:

a third diaphragm;

an actuator coupled to the third diaphragm and disposed near the second diaphragm;

the third disphragm being flexed in response to an increase in manifold vacuum for displacing the actuator; and the displaced actuator flexing the second diaphragm for causing the volumetric displacement of the incompressible fluid.

* * * * *